(12) United States Patent
Morimoto et al.

(10) Patent No.: US 11,831,849 B2
(45) Date of Patent: Nov. 28, 2023

(54) INFORMATION PROCESSING DEVICE AND METHOD OF CONTROLLING IMAGE FORMING APPARATUS

(71) Applicant: CANON KABUSHIKI KAISHA, Tokyo (JP)

(72) Inventors: Kazusa Morimoto, Chiba (JP); Norio Negishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/685,247

(22) Filed: Mar. 2, 2022

(65) Prior Publication Data
US 2022/0294933 A1    Sep. 15, 2022

(30) Foreign Application Priority Data

Mar. 10, 2021   (JP) ................................ 2021-038564
Mar. 10, 2021   (JP) ................................ 2021-038570

(51) Int. Cl.
*H04N 1/60*   (2006.01)

(52) U.S. Cl.
CPC ......... *H04N 1/6044* (2013.01); *H04N 1/6005* (2013.01); *H04N 1/6008* (2013.01); *H04N 1/6025* (2013.01)

(58) Field of Classification Search
CPC ......................... H04N 1/6044; H04N 1/00045
See application file for complete search history.

(56) References Cited

U.S. PATENT DOCUMENTS

| | | | | |
|---|---|---|---|---|
| 6,178,254 B1* | 1/2001 | Rappette | ................ | G01N 21/89 250/559.01 |
| 6,757,076 B1* | 6/2004 | Mestha | ................ | H04N 1/6052 358/1.9 |
| 8,964,246 B2* | 2/2015 | Sakatani | ............ | G03G 15/0131 358/1.9 |
| 11,165,931 B2* | 11/2021 | Yoshizawa | .............. | G01J 3/524 |

(Continued)

FOREIGN PATENT DOCUMENTS

| CN | 106506902 A | * | 3/2017 | ......... H04N 1/00023 |
|---|---|---|---|---|
| CN | 107040679 A | * | 8/2017 | ......... H04N 1/00023 |

(Continued)

OTHER PUBLICATIONS

Extended European Search Report dated Aug. 5, 2022 in counterpart EP Application No. 22160992.8.

*Primary Examiner* — Ted W Barnes
(74) *Attorney, Agent, or Firm* — Venable LLP

(57) ABSTRACT

An information processing device includes: an acquisition unit configured to acquire color information on a specific color included in an inspection image, and a determination condition for determining a color shift with respect to the specific color; and a controller configured to: determine, based on the color information and the determination condition acquired by the acquisition unit, test image data representing a plurality of test images to be formed by an image forming apparatus; output the determined test image data to the image forming apparatus in order to form the plurality of test images; acquire luminance data on the plurality of test images, the luminance data being output from a color sensor; acquire spectral data on the plurality of test images, the spectral data being output from a spectroscopic sensor.

11 Claims, 11 Drawing Sheets

(56) References Cited

U.S. PATENT DOCUMENTS

| | | | |
|---|---|---|---|
| 2005/0018219 A1* | 1/2005 | Senn | H04N 1/6044 358/1.9 |
| 2008/0204771 A1* | 8/2008 | Albat | H04N 1/40006 358/1.9 |
| 2010/0045987 A1* | 2/2010 | Bonikowski | H04N 1/6044 356/402 |
| 2011/0032550 A1* | 2/2011 | Torigoe | H04N 1/60 358/1.9 |
| 2012/0327435 A1* | 12/2012 | Ishii | H04N 1/6033 358/1.9 |
| 2014/0111807 A1* | 4/2014 | Yin | G01J 3/0294 356/402 |
| 2014/0139883 A1* | 5/2014 | Hashizume | H04N 1/00031 358/3.06 |
| 2014/0185114 A1* | 7/2014 | Takemura | H04N 1/00013 358/504 |
| 2016/0127612 A1* | 5/2016 | Satomi | H04N 1/32309 358/1.18 |
| 2017/0374237 A1* | 12/2017 | Muller | B41J 29/393 |
| 2018/0198958 A1* | 7/2018 | Yoshida | G06K 15/129 |
| 2020/0267285 A1* | 8/2020 | Hioki | B41J 29/393 |
| 2022/0019166 A1* | 1/2022 | Seki | G03G 15/234 |
| 2022/0030137 A1* | 1/2022 | Yoshizawa | H04N 1/6044 |

FOREIGN PATENT DOCUMENTS

| | | | |
|---|---|---|---|
| JP | 2002-064719 | 2/2002 | |
| JP | 2002064719 A * | 2/2002 | |
| JP | 2012-053089 | 3/2012 | |
| JP | 2012053089 A * | 3/2012 | G03G 15/0131 |
| JP | 2017007251 A * | 1/2017 | G06K 15/027 |
| JP | 2019062287 A * | 4/2019 | H04N 1/4057 |
| JP | 2019186809 A * | 10/2019 | |
| JP | 6834495 B2 * | 2/2021 | G06K 15/129 |
| JP | 6969486 B2 * | 11/2021 | |

* cited by examiner

INFORMATION PROCESSING DEVICE AND METHOD OF CONTROLLING IMAGE FORMING APPARATUS

BACKGROUND OF THE INVENTION

Field of the Invention

The present disclosure relates to a technology of inspecting color of an image printed on a printed material.

Description of the Related Art

In an image forming apparatus for forming an image by employing an electrophotographic process, characteristics in respective processes of charging, developing, transferring, and fixing change depending on temporal changes and environmental changes. As a result, image densities or colors of a printed material may change. Accordingly, in the image forming apparatus, image stabilizing control is performed. The image stabilizing control is control involving detecting, by an optical sensor, a detection image for detecting a density of an image formed on an image bearing member, and adjusting, based on a detection result, an image forming condition so that the image on the image bearing member has an appropriate image density. The image forming condition refers to various settings used at the time of image formation, such as a charging amount of the image bearing member and a light emission energy amount of laser for scanning the image bearing member.

The image stabilizing control is control for a process to be performed before the image is transferred onto a recording sheet. Thus, the image stabilizing control cannot control the influence on the image density to be caused in processes from the transferring process. For example, the image stabilizing control cannot handle variations in transfer efficiency to be caused by environmental variations in a case where a toner image is transferred from the image bearing member onto the recording sheet. Accordingly, the image density of the image to be finally formed on the recording sheet may have variations. In contrast, the image forming apparatus of Japanese Patent Application Laid-open No. 2012-53089 causes an optical sensor to detect the detection image after the detection image is fixed to the recording sheet, and adjusts the image forming condition based on the detection result, to thereby suppress the influence on the image density to be caused in the processes from the transferring process.

A corporate color to be used in, for example, a logo or a design mark of a company is determined as an important component for identifying the company. Accordingly, a printed material including the corporate color is required to be output so that, even when the color is unique, the color comes out as strictly determined. However, in the related art, calibration of color reproducibility is performed with reference to a color having a high use frequency in the image to be printed, and hence it is difficult to strictly reproduce the specific color designated by the user.

In recent years, there has been proposed a color inspecting system which reads a color of an image of a printed material during printing and inspects the color of the read color. In United States Patent Application Publication No. 2012/0327435 A1, there is disclosed an image forming apparatus for performing a color inspection. This image forming apparatus prints, on the recording sheet, a measurement patch for measuring a specific color designated by the user. The image forming apparatus performs the color stabilizing control based on results of measuring the color of the measurement patch by an image sensor. In a case where the results of measuring the color are outside of an allowable range, the image forming apparatus notifies the user of this fact, and performs the color stabilizing control again.

The image sensor to be used for measuring the color of the image printed on the printed material outputs, as the color measurement results, luminance values (RGB data) of three colors of red (R), green (G), and blue (B). This RGB data is converted into spectral data formed of L*, a*, b* of the CIELab color space. For the conversion of the RGB data into the CIELab color space, a color conversion table being a look-up table is used. In the color conversion table, in general, not all color conversion values (Lab values) for all input values (luminance values of R, G, and B) are registered, but color conversion values at only a plurality of grid points regularly arranged in an input color space are registered. In a case where such a color conversion table is used to perform the color conversion, the color conversion values other than the grid points are obtained through interpolation operation performed based on the color conversion values registered at the grid points (Japanese Patent Application Laid-open No. 2002-64719).

As the image sensor, an optical sensor is frequently used. The optical sensor generates output values from light received via color filters of red (R), green (G), and blue (B) having sensitivities different from that of the sense of sight of human. Accordingly, in a case where the optical sensor is used to perform the color measurement, depending on the color, it is difficult for the optical sensor to perform the color measurement with desired accuracy. This also affects the results of the color inspection. Accordingly, there has been a demand for an image forming apparatus capable of performing color measurement of an image to be used for color inspection with high accuracy.

Further, the color conversion using the color conversion table is performed by a method of performing conversion into the Lab values throughout the entire color gamut that can be expressed by the three colors of R, G, and B. With this method, the entire color gamut is subjected to the color conversion at a level free from strangeness. However, in a color gamut in which Lab is liable to change with respect to each color in RGB data, a conversion error is increased, and highly accurate color inspection becomes difficult. Accordingly, there has been a demand for an image forming apparatus capable of inspecting the color with high accuracy.

SUMMARY OF THE INVENTION

An information processing device according to the present disclosure includes:
an acquisition unit configured to acquire color information on a specific color included in an inspection image, and a determination condition for determining a color shift with respect to the specific color; and a controller configured to: determine, based on the color information and the determination condition acquired by the acquisition unit, test image data indicating a plurality of test images to be formed by an image forming apparatus; output the determined test image data to the image forming apparatus in order to form the plurality of test images; acquire luminance data on the plurality of test images, the luminance data being output from a color sensor; acquire spectral data on the plurality of test images, the spectral data being output from a spectroscopic sensor; generate, based on the spectral data and the luminance data, a conversion condition for converting a reading result obtained by the color sensor; acquire luminance data on an image to be formed by the image forming apparatus, the luminance data on the image to be formed by the image forming apparatus being output from the color sensor; convert, based on the conversion condition, the luminance data on the image to be formed by the image forming apparatus; and determine, based on converted luminance data and the determination condition, the color shift with respect to the specific color in the inspection image, wherein the plurality of test images include a first test image of a first color in which a color difference from the specific color has a first value, and a second test image of a second color in which the color difference from the specific color has a second value, wherein the first value is smaller than a value of the color difference corresponding to the determination condition, and wherein the second value is larger than the value of the color difference corresponding to the determination condition.

A method of controlling an image forming apparatus for forming an image to a sheet according to the present disclosure includes: a first acquisition step of acquiring color information on a specific color included in an inspection image; a second acquisition step of acquiring a determination condition for determining a color shift with respect to the specific color; a determination step of determining, based on the color information and the determination condition, test image data representing a plurality of test images; a test print step of printing the plurality of test images based on the test image data; a first reading step of reading the plurality of test images by a color sensor, the color sensor being configured to receive reflected light from a measurement target and output red luminance data, green luminance data, and blue luminance data on the measurement target; a second reading step of reading the plurality of test images by a spectroscopic sensor, the spectroscopic sensor being configured to receive the reflected light from the measurement target, detect a light intensity of each of a plurality of wavelengths which are more than 3 for the measurement target, and output spectral data based on the light intensity of each of the plurality of wavelengths; a generation step of generating, based on the spectral data and the luminance data, a conversion condition for converting a reading result obtained by the color sensor; a print step of printing the inspection image; a third reading step of reading the inspection image by the color sensor; a conversion step of converting the luminance data on the inspection image based on the conversion condition; and a determination step of determining, based on converted luminance data and the determination condition, the color shift with respect to the specific color in the inspection image, wherein the plurality of test images include a first test image of a first color in which a color difference from the specific color has a first value, and a second test image of a second color in which the color difference from the specific color has a second value, wherein the first value is smaller than a value of the color difference corresponding to the determination condition, and wherein the second value is larger than the value of the color difference corresponding to the determination condition.

Further features of the present invention will become apparent from the following description of exemplary embodiments (with reference to the attached drawings).

DESCRIPTION OF THE EMBODIMENTS

Now, embodiments of the present disclosure are described in detail with reference to the drawings. However, the following embodiments are not to limit the disclosure laid down in the scope of patent claims, and not all of combinations of features described in the embodiments are indispensable to the solving means of the present disclosure.

First Embodiment

<Printing System>

Figure 1:
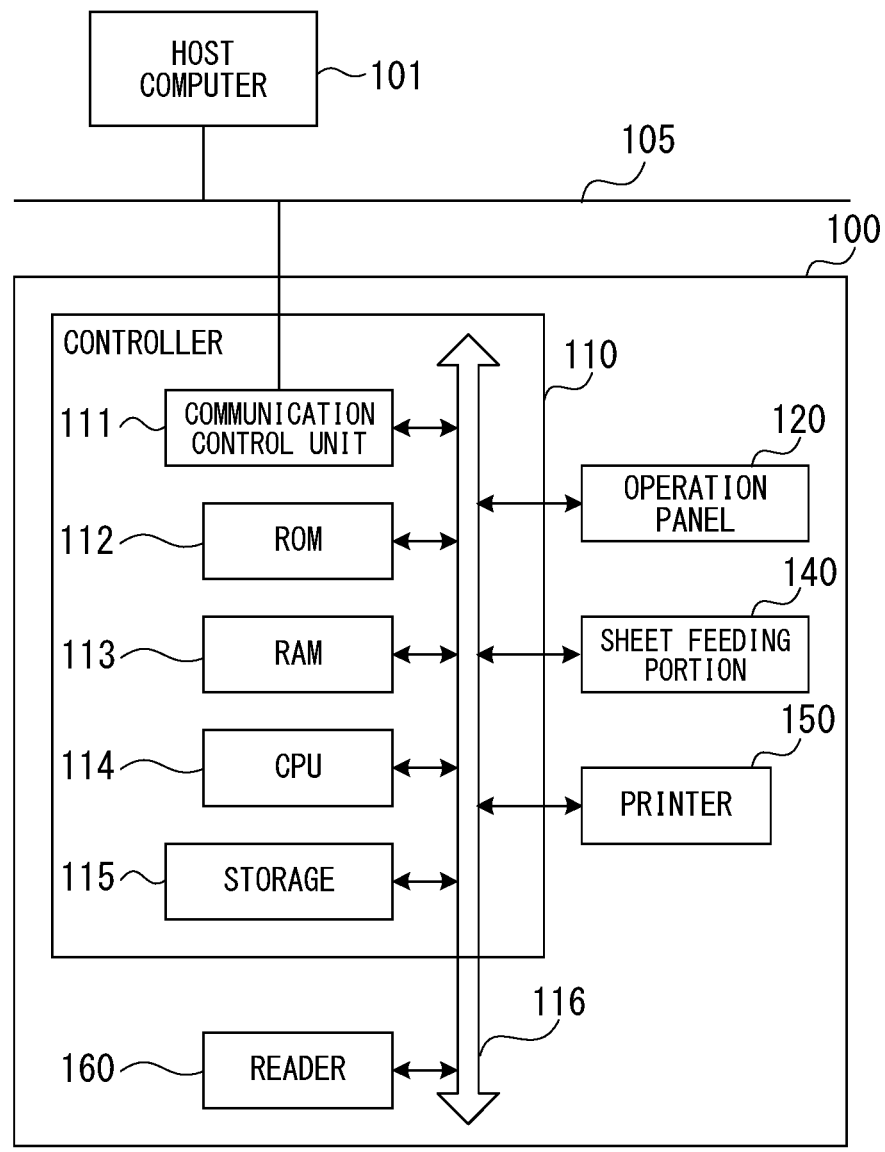
FIG. 1 is an explanatory diagram of a configuration of a printing system.

FIG. 1 is an explanatory diagram of a configuration of a printing system. The printing system includes an image forming apparatus 100 and a host computer 101. The image forming apparatus 100 and the host computer 101 are communicably connected through a network 105. The network 105 is formed of a communication line such as a local area network (LAN), a wide area network (WAN), or a public communication line. A plurality of the image forming apparatus 100 and a plurality of the host computers 101 may be connected to the network 105.

The host computer 101 is, for example, a server apparatus, and transmits a print job to the image forming apparatus 100 through the network 105. A print job includes various kinds of printing information required for printing, such as image data, the type of recording sheet to be used in printing, the number of sheets to be printed, and an instruction to perform double-sided printing or single-sided printing.

The image forming apparatus 100 includes a controller 110, an operation panel 120, a sheet feeding portion 140, a printer 150, and a reader 160. The controller 110, the operation panel 120, the sheet feeding portion 140, the printer 150, and the reader 160 are connected to be communicable to/from one another through a system bus 116. The image forming apparatus 100 controls operation of the printer 150 based on the print job acquired from the host computer 101 to form an image based on the image data on a recording sheet.

The controller 110 controls operations of respective units of the image forming apparatus 100. The controller 110 is an information processing device including a read only memory (ROM) 112, a random access memory (RAM) 113, and a central processing unit (CPU) 114. The controller 110 includes a communication control unit 111, and a storage 115. Modules are connected to be communicable to/from one another through the system bus 116.

The communication control unit 111 is a communication interface for performing communication to/from the host computer 101 and other devices through the network 105. The storage 115 is a mass storage device formed of, for example, a hard disk drive (HDD) or a solid state drive (SSD). The storage 115 stores a computer program and various kinds of data used in image forming processing (print processing). The CPU 114 executes a computer program stored in the ROM 112 or the storage 115 to control operation of the image forming apparatus 100. The RAM 113 provides a work area used by the CPU 114 in executing the computer program.

The operation panel 120 is a user interface, and includes an input interface and an output interface. The input interface includes, for example, operation buttons, numeric keys, or a touch panel. The output interface includes, for example, a liquid crystal display (LCD) or other displays, or a loudspeaker. A user can input a print job, a command, and print settings, for example, to the image forming apparatus 100 through the operation panel 120. The operation panel 120 displays a setting screen and a status of the image forming apparatus 100 on the display.

The sheet feeding portion 140 includes a plurality of sheet feeding stages for containing recording sheets, which are to be described later. The sheet feeding portion 140 feeds the recording sheet of the type specified in the print job from a sheet feeding stage containing the recording sheet. The sheet feeding stage contains a plurality of recording sheets (recording sheet bundle), and the sheet feeding portion 140 feeds recording sheets in order from a recording sheet at the top. The sheet feeding portion 140 conveys the recording sheet fed from the sheet feeding stage to the printer 150. The respective sheet feeding stages may contain recording sheets of the same type, or may contain recording sheets of different types.

The printer 150 prints an image on the recording sheet fed from the sheet feeding portion 140 based on the image data included in the print job, to thereby generate a printed material. The reader 160 is an image reading apparatus for reading images from the printed material generated by the printer 150, and transmitting a reading result to the controller 110. The images read by the reader 160 are images (detection images) for adjusting an image forming condition to be used when the printer 150 forms an image. The controller 110 detects states of the images such as image quality from a result of reading the detection images by the reader 160, and adjusts the image forming condition based on the detected states of the images. In the first embodiment, the controller 110 detects the image densities from the detection images, and the image forming condition is adjusted based on the detected image densities.

<Image Forming Apparatus>

Figure 2:
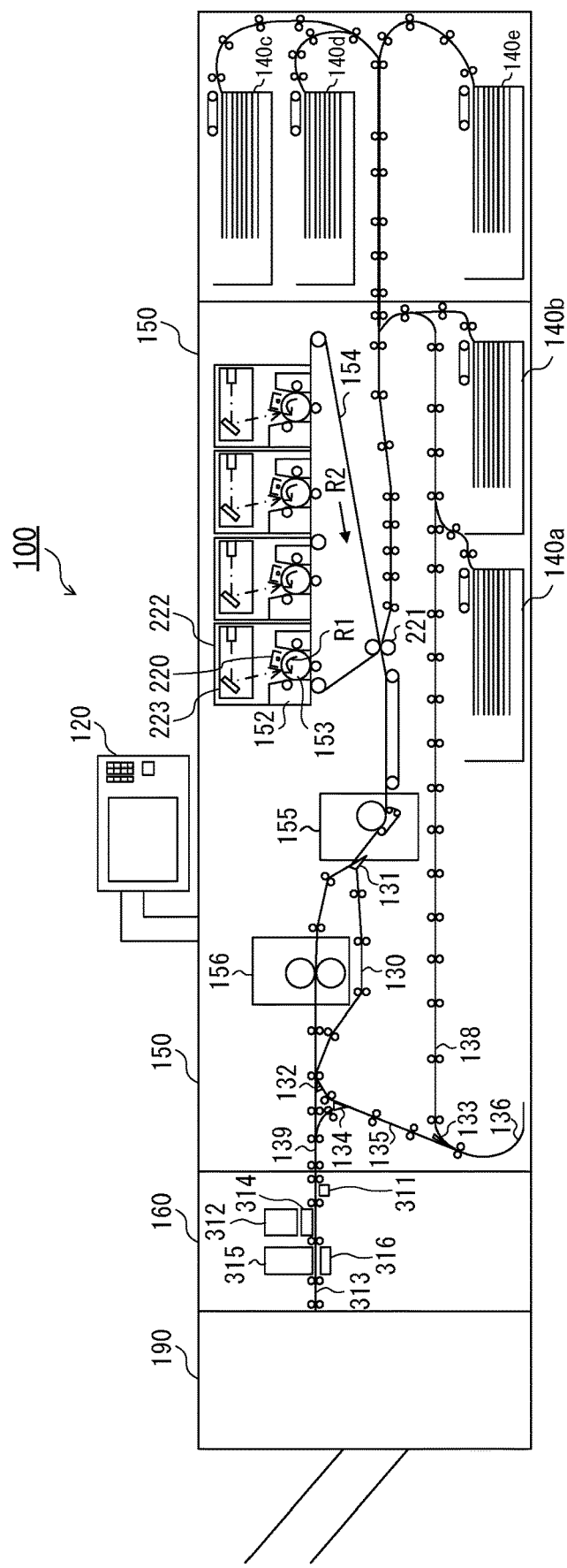
FIG. 2 is a view of a configuration of an image forming apparatus.

FIG. 2 is a view of a configuration of the image forming apparatus 100. The image forming apparatus 100 includes, in order from an upstream side in a conveying direction of the recording sheet, sheet feeding stages 140*a* to 140*e*, the printer 150, the reader 160, and a finisher 190. The sheet feeding stages 140*a* to 140*e* form the sheet feeding portion 140. The finisher 190 is a post-processing apparatus for performing post-processing on the printed material generated by the printer 150. The finisher 190 performs, for example, stapling and sorting on a plurality of printed materials.

The printer 150 includes a plurality of image forming units 222 for forming images of different colors, respectively. The printer 150 in the first embodiment includes four image forming units 222 in order to form images of four colors: yellow (Y), magenta (M), cyan (C), and black (K). The image forming units 222 are different only in color of the images to be formed, and perform a similar operation with a similar configuration.

One image forming unit 222 includes a photosensitive drum 153, a charging device 220, an exposure device 223, and a developing device 152. The photosensitive drum 153 is a drum-shaped photosensitive member having a photosensitive layer on a surface thereof, and is driven to rotate in a direction of an arrow R1 by a motor (not shown). The charging device 220 charges the surface (photosensitive layer) of the rotating photosensitive drum 153. The exposure device 223 exposes the charged surface of the photosensitive drum 153 with laser light. The laser light scans the surface of the photosensitive drum 153 in an axial direction of the photosensitive drum 153. The direction in which the laser light scans the surface of the photosensitive drum 153 is a main scanning direction of the printer 150 (depth direction of FIG. 2). As a result, an electrostatic latent image is formed on the surface of the photosensitive drum 153. The developing device 152 develops the electrostatic latent image with the use of a developer (toner). As a result, an image (toner image) obtained by visualizing the electrostatic latent image is formed on the surface of the photosensitive drum 153.

The printer 150 includes an intermediate transfer belt 154 to which toner images generated by the respective image forming units 222 are transferred. The intermediate transfer belt 154 is driven to rotate in a direction of an arrow R2. The toner images of the respective colors are transferred at timings corresponding to the rotation of the intermediate transfer belt 154. As a result, a full-color toner image obtained by superimposing the toner images of the respective colors on one another is formed on the intermediate transfer belt 154. The full-color toner image is conveyed, with the rotation of the intermediate transfer belt 154, to a nip portion formed by the intermediate transfer belt 154 and transfer rollers 221. The full-color toner image is transferred onto the recording sheet by the nip portion.

Recording sheets are contained in the sheet feeding stages 140*a*, 140*b*, 140*c*, 140*d*, and 140*e* of the sheet feeding portion 140, and are fed in accordance with timings at which the images are formed by the image forming units 222. A sheet feeding stage to feed a recording sheet is instructed by the print job. The recording sheet is conveyed to the nip portion formed by the intermediate transfer belt 154 and the transfer rollers 221 at a timing when the full-color toner image is conveyed to the nip portion. As a result, the toner image is transferred at a predetermined position of the recording sheet. The conveying direction of the recording sheet is a sub-scanning direction, which is orthogonal to the main scanning direction.

The printer 150 includes a first fixing device 155 and a second fixing device 156, each of which fixes a toner image on the recording sheet by heating and pressurizing. The first fixing device 155 includes a fixing roller including a heater, and a pressure belt for bringing the recording sheet into pressure contact with the fixing roller. The fixing roller and the pressure belt are driven by a motor (not shown) to pinch and convey the recording sheet. The second fixing device 156 is arranged on a downstream side of the first fixing device in the conveying direction of the recording sheet. The second fixing device 156 is used to increase gloss and ensure fixability for the image on the recording sheet that has passed through the first fixing device 155. The second fixing device 156 includes a fixing roller including a heater, and a pressure roller including a heater. Depending on the type of the recording sheet, the second fixing device 156 is not used. In this case, the recording sheet is not conveyed to the second fixing device 156, but is conveyed to a conveyance path 130. To that end, on the downstream side of the first fixing device 155, there is provided a flapper 131 for guiding the recording sheet to any one of the conveyance path 130 and the second fixing device 156.

On the downstream side of a position at which the conveyance path 130 merges on the downstream side of the second fixing device 156, a conveyance path 135 and a discharge path 139 are provided. Therefore, at the position at which the conveyance path 130 merges on the downstream side of the second fixing device 156, there is provided a flapper 132 for guiding the recording sheet to any one of the conveyance path 135 and the discharge path 139. The flapper 132 guides, for example, in a double-sided printing mode, the recording sheet having an image formed on a first surface thereof to the conveyance path 135. The flapper 132 guides, for example, in a face-up discharge mode, the recording sheet having the image formed on the first surface thereof to the discharge path 139. The flapper 132 guides, for example, in a face-down discharge mode, the recording sheet having the image formed on the first surface thereof to the conveyance path 135.

The recording sheet conveyed to the conveyance path 135 is conveyed to a reversing portion 136. The recording sheet conveyed to the reversing portion 136 has the conveying direction reversed after the conveying operation is stopped once. The recording sheet is guided from the reversing portion 136 to any one of the conveyance path 135 and a conveyance path 138 by a flapper 133. The flapper 133 guides, for example, in the double-sided printing mode, the recording sheet having the conveying direction reversed to the conveyance path 138 in order to print an image on a second surface. The recording sheet conveyed to the conveyance path 138 is conveyed toward the nip portion between the intermediate transfer belt 154 and the transfer rollers 221. As a result, front and back sides of the recording sheet at the time of passing through the nip portion are reversed, and the image is formed on the second surface. The flapper 133 guides, for example, in the face-down discharge mode, the recording sheet having the conveying direction reversed to the conveyance path 135. The recording sheet conveyed to the conveyance path 135 by the flapper 133 is guided to the discharge path 139 by a flapper 134.

The recording sheet having the images formed thereon by the printer 150 is conveyed from the discharge path 139 to the reader 160. The reader 160 is an image reading apparatus for performing color measurement of a user image printed on the recording sheet in accordance with the print job, and reading the image density of the detection image printed on the recording sheet. The recording sheet conveyed from the printer 150 to the reader 160 is conveyed along a conveyance path 313 included in the reader 160. The reader 160 includes an original detection sensor 311, a line sensor unit 312, and a spectroscopic sensor unit 315 on the conveyance path 313. Between the line sensor unit 312 and the conveyance path 313, a flow reading glass 314 is arranged. At a position opposed to the spectroscopic sensor unit 315 across the conveyance path 313, a white plate 316 is arranged. The reader 160 performs color measurement by the line sensor unit 312 and the spectroscopic sensor unit 315 while conveying the recording sheet having the images printed thereon by the printer 150 along the conveyance path 313.

The original detection sensor 311 is, for example, an optical sensor including a light emitting element and a light receiving element. The original detection sensor 311 detects a leading edge in the conveying direction of the recording sheet conveyed along the conveyance path 313. A result of detecting the leading edge of the recording sheet by the original detection sensor 311 is transmitted to the controller 110. The controller 110 starts operation of reading by the reader 160 (line sensor unit 312 and spectroscopic sensor unit 315) based on a timing when the leading edge of the recording sheet is detected by the original detection sensor 311. The line sensor unit 312 is an optical sensor provided on the side of the recording sheet surface on which the images are formed, so as to read the detection image printed on the recording sheet being conveyed. The spectroscopic sensor unit 315 is provided on the side of the recording sheet surface on which the images are formed, so as to be driven in the main scanning direction to measure the colors of the images formed on the recording sheet.

<Reader>

Figure 3:
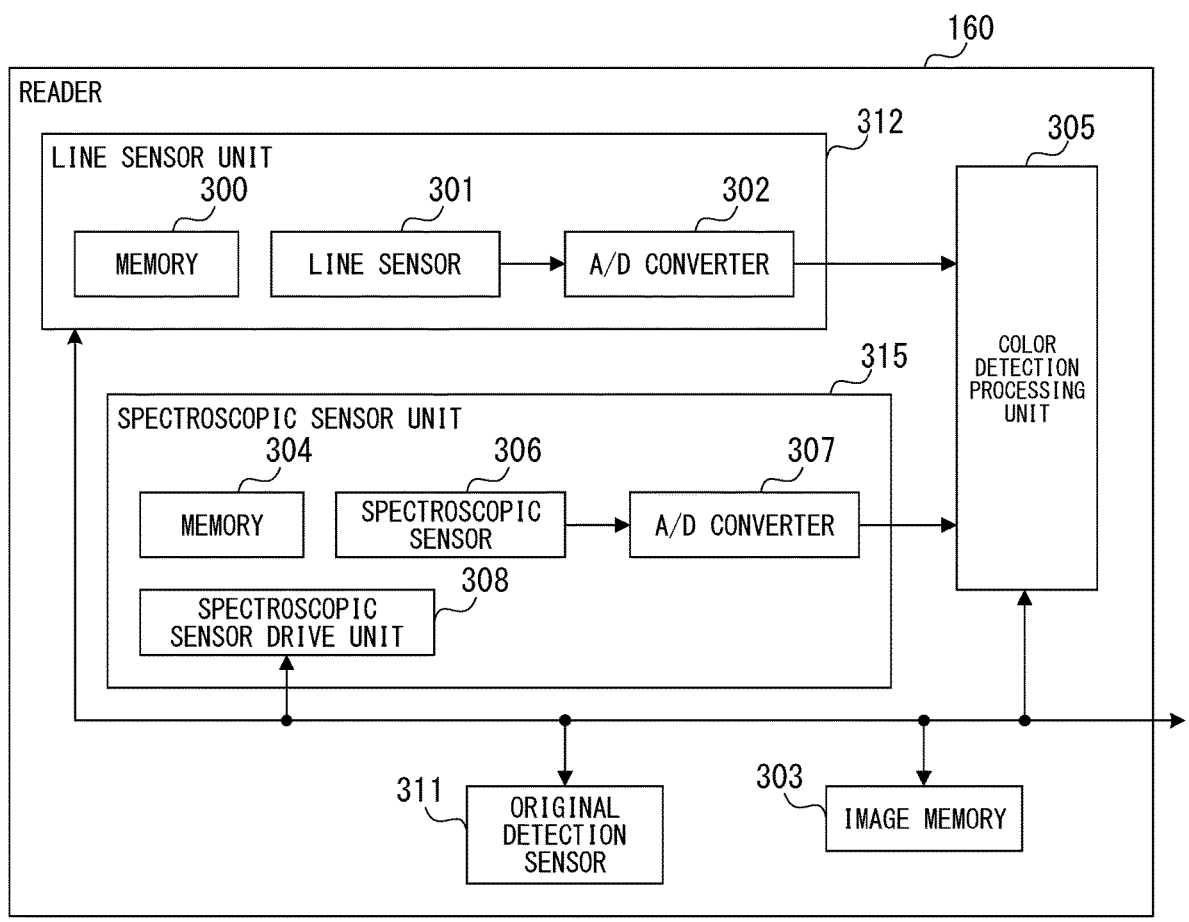
FIG. 3 is an explanatory diagram of a configuration of a reader.

FIG. 3 is an explanatory diagram of a configuration of the reader 160. The reader 160 includes, in addition to the line sensor unit 312, the spectroscopic sensor unit 315, and the original detection sensor 311, an image memory 303 and a color detection processing unit 305. Operations of the line sensor unit 312, the spectroscopic sensor unit 315, the image memory 303, the color detection processing unit 305, and the original detection sensor 311 are controlled by the CPU 114 of the controller 110.

The line sensor unit 312 includes a line sensor 301, a memory 300, and an A/D converter 302. The line sensor 301 is, for example, a contact image sensor (CIS). The line sensor 301 is a color sensor formed of light receiving elements including respective color filters of red, green, and blue. The light receiving element including the red color filter mainly receives light of 630 nm in reflected light from a measurement target, and outputs a signal that is based on the luminance value of the light of 630 nm. The light receiving element including the green color filter mainly receives light of 530 nm in the reflected light from the measurement target, and outputs a signal that is based on the luminance value of the light of 530 nm. The light receiving element including the blue color filter mainly receives light of 440 nm in the reflected light from the measurement target, and outputs a signal that is based on the luminance value of the light of 440 nm. In the memory 300, correction information, such as light amount variations between pixels of the line sensor 301, a level difference between the pixels, and a distance between the pixels, is stored. The A/D converter 302 acquires an analog signal being a reading result obtained by the line sensor 301. The A/D converter 302 converts the acquired analog signal into a digital signal, and transmits the digital signal to the color detection processing unit 305. The digital signal is read data (luminance data) of red (R), green (G), and blue (B).

The spectroscopic sensor unit 315 includes a spectroscopic sensor 306, a memory 304, an A/D converter 307, and a spectroscopic sensor drive unit 308. The spectroscopic sensor 306 is formed of, for example, a light source, a lens, a diffraction grating surface, and a light receiving portion. The light receiving portion is, for example, a CMOS sensor. The spectroscopic sensor 306 irradiates the measurement target with light from the light source, and disperses the reflected light for each wavelength by the diffraction grating. The spectroscopic sensor 306 receives the light dispersed for each wavelength at pixels provided in the light receiving portion separately for each wavelength, and performs photoelectric conversion into a voltage value of each wavelength. The light receiving portion of the spectroscopic sensor 306 receives, for example, light of from 380 nm to 780 nm with the light being divided into wavelengths in units of 10 nm. The light receiving portion outputs a voltage that is based on a light intensity of each wavelength as an analog signal. The output value of the light of each wavelength, which has been converted into a voltage value, is an analog signal. The A/D converter 307 converts this analog signal into a digital signal, and transmits the digital signal to the color detection processing unit 305 as spectral data. In the memory 304, various kinds of correction information, such as stray light data and dark current data of the spectroscopic sensor 306, are stored. The spectroscopic sensor drive unit 308 is a drive source for driving the spectroscopic sensor unit 315 in the main scanning direction.

The color detection processing unit 305 is formed of a semiconductor device, such as a field-programmable gate array (FPGA) or an application specific integrated circuit (ASIC). The color detection processing unit 305 derives average values (average luminance values ($R_A$, $G_A$, $B_A$)) of the luminance values of the respective colors (each of RGB) in a color measurement region (detection image part) from the luminance data of RGB acquired from the line sensor unit 312, and transmits the average values to the CPU 114. The CPU 114 includes a color conversion look-up table $LUT_{IN}$ for converting the luminance values (RGB data) of the respective colors of RGB into L*, a*, b* values. The CPU 114 uses the color conversion look-up table $LUT_{IN}$ to convert the average luminance values ($R_A$, $G_A$, $B_A$) of the respective colors into the $L_a^*$, $a_a^*$, $b_a^*$ values. The color detection processing unit 305 calculates the L*, a*, b* values from the spectral data acquired from the spectroscopic sensor unit 315. The color detection processing unit 305 outputs the calculated L*, a*, b* values to the CPU 114.

Operations of the line sensor unit 312, the spectroscopic sensor unit 315, the image memory 303, the color detection processing unit 305, and the original detection sensor 311 are controlled by the CPU 114 of the controller 110. The image memory 303 stores image data required for image processing performed by the CPU 114.

<Line Sensor>

Figure 4:
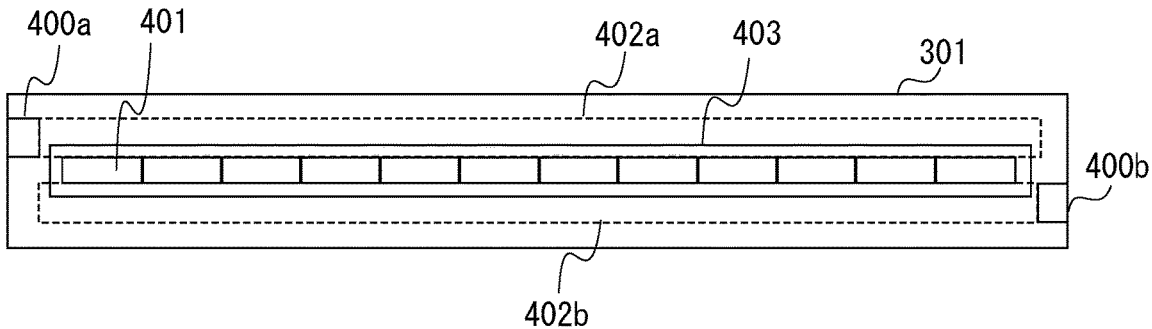
FIG. 4 is an explanatory view of a configuration of a line sensor.

FIG. 4 is an explanatory diagram of a configuration of the line sensor 301. The line sensor 301 includes light emitting portions 400a and 400b, light guiding members 402a and 402b, a lens array 403, and a sensor chip group 401. The line sensor 301 has a substantially rectangular parallelepiped shape, and reads an image with a longitudinal direction thereof being a main scanning direction.

Each of the light emitting portions 400a and 400b is, for example, a light source formed of a light emitting diode (LED) that emits white light. The light guiding member 402a has the light emitting portion 400a arranged in an end portion thereof, and irradiates the recording sheet with light emitted from the light emitting portion 400a. The light guiding member 402b has the light emitting portion 400b arranged at an end thereof, and irradiates the recording sheet with light emitted from the light emitting portion 400b. Each of the light guiding members 402a and 402b is formed in straight line in the main scanning direction. Therefore, the line sensor 301 irradiates the recording sheet with light in line in the main scanning direction. The main scanning direction of the line sensor unit 312 and the main scanning direction of the printer 150 are the same direction.

The lens array 403 is an optical system for guiding reflected light from the recording sheet of the light irradiated from the light emitting portions 400a and 400b to the sensor chip group 401. The sensor chip group 401 is formed of a plurality of photoelectric conversion elements (sensor chips) arrayed in line in the main scanning direction. One sensor chip reads an image of one pixel. The plurality of sensor chips in the first embodiment have a three-line configuration. One line is coated with a red (R) color filter, other one line is coated with a green (G) color filter, and the other one line is coated with a blue (B) color filter. The light guided by the lens array 403 forms an image on a light receiving surface of each sensor chip of the sensor chip group 401.

The light emitted from the light emitting portions 400a and 400b is diffused inside the light guiding members 402a and 402b, and is output from a portion having a curvature to illuminate the entire area in the main scanning direction of the recording sheet. The light guiding member 402a and the light guiding member 402b are arranged across the lens array 403 in a sub-scanning direction, which is orthogonal to the main scanning direction. Therefore, the line sensor 301 has a both-side illumination configuration in which the lens array 403 (image reading line) is irradiated with light from two directions of the sub-scanning direction. The sub-scanning direction of the line sensor unit 312 and the sub-scanning direction of the printer 150 are the same direction.

<Spectroscopic Sensor Unit>

Figure 5:
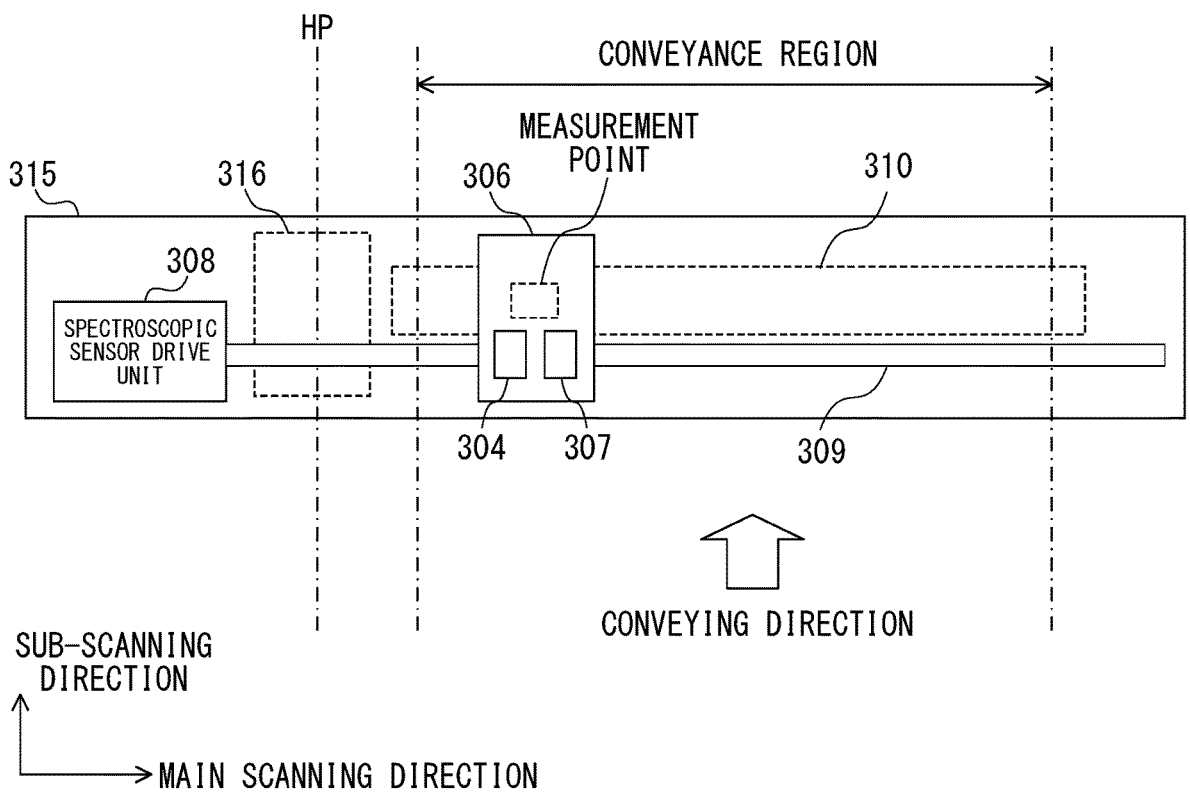
FIG. 5 is an explanatory diagram of a configuration of a spectroscopic sensor unit.

FIG. 5 is an explanatory diagram of a configuration of the spectroscopic sensor unit 315. The spectroscopic sensor unit 315 has a substantially rectangular parallelepiped shape with a longitudinal direction thereof being the main scanning direction. The recording sheet is conveyed in the sub-scanning direction on the depth side of the spectroscopic sensor unit 315 of FIG. 5. The spectroscopic sensor 306, the memory 304, and the A/D converter 307 are integrally formed. The A/D converter 307 is connected to the color detection processing unit 305 through a wiring line such as a flexible flat cable (not shown).

The spectroscopic sensor 306 is provided on a rail 309 extending from the spectroscopic sensor drive unit 308 in the main scanning direction. The spectroscopic sensor 306 is moved on the rail 309 by the spectroscopic sensor drive unit 308. The spectroscopic sensor drive unit 308 incorporates a stepping motor, and is controlled based on the instruction from the CPU 114. The spectroscopic sensor drive unit 308 can move the spectroscopic sensor 306 to a predetermined position in the main scanning direction with high accuracy.

On the outer side of a region (conveyance region) in which the spectroscopic sensor unit 315 can read the recording sheet, a home position HP is provided. The white plate 316 is arranged at the home position HP. The recording sheet is conveyed line by line in the sub-scanning direction, and is brought into a stop state at the timing of color measurement. The spectroscopic sensor unit 315 has an opening portion 310 at a position corresponding to the conveyance region. The spectroscopic sensor 306 reads the recording sheet through the opening portion 310.

The spectroscopic sensor 306 is positioned at the home position HP before the color measurement is started. In a case where an instruction to start the color measurement is given from the CPU 114, the spectroscopic sensor 306 reads the white plate 316 so as to perform calibration, such as light source light amount adjustment or white reference matching. The spectroscopic sensor 306 starts to move in the main scanning direction at an equal speed from the home position HP after the calibration, and starts color measurement of one line in response to detection of a trigger patch being a trigger. In a case where the spectroscopic sensor 306 ends the color measurement of one line, the spectroscopic sensor 306 returns to the home position HP. After that, after the recording sheet is moved for one line in the sub-scanning direction, the spectroscopic sensor 306 starts to move in the main scanning direction again to perform color measurement for one line. Such movement of the recording sheet for one line and color measurement of the spectroscopic sensor 306 for one line are repeated so that the color measurement of one recording sheet is performed.

<Color Inspection>

Figure 6:
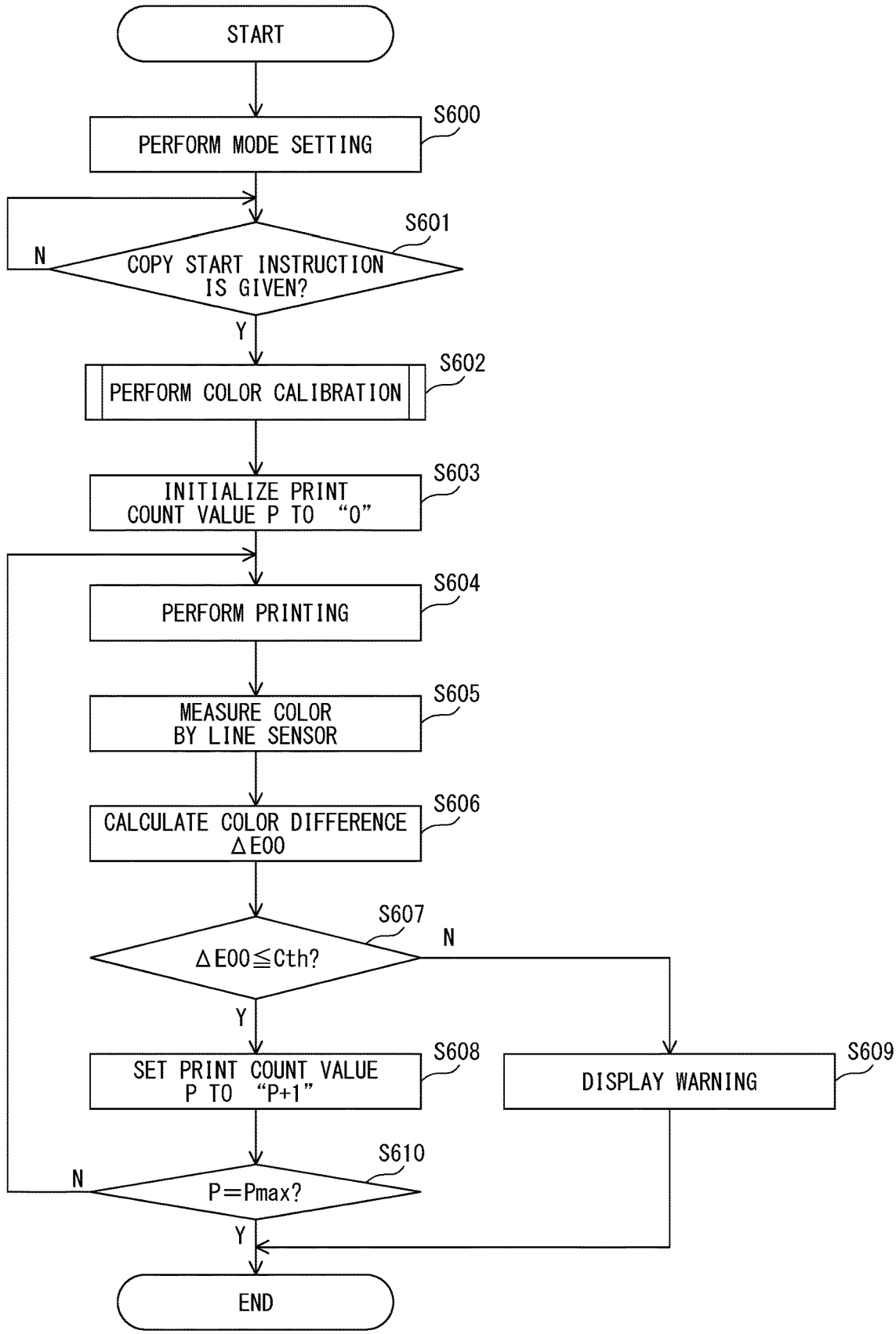
FIG. 6 is a flow chart for illustrating print processing including color inspection processing.

FIG. 6 is a flow chart for illustrating print processing including color inspection processing. This processing is started when the user inputs an instruction of color inspection through the operation panel 120 so as to input an instruction to start the copy. The instruction of color inspection includes, for example, a recording sheet size, a print mode, the number $P_{MAX}$ of sheets to be printed, color values (specific color: $L_{00}^*$, $a_{00}^*$, $b_{00}^*$) for which the color inspection is desired, a color inspection designation region (region $X=X_S$ to $X_E$, $Y=Y_S$ to $Y_E$ on the sheet), and a color inspection threshold value Cth.

The CPU 114 acquires the instruction of color inspection from the operation panel 120, and performs, based on the instruction, setting of information required for the print job to each apparatus, and storing of various parameters included in the instruction into the RAM 113, to thereby perform mode setting (Step S600). The CPU 114 waits for a copy start instruction from the operation panel 120 after the mode setting is performed (Step S601: N).

After the CPU 114 acquires the copy start instruction (Step S601: Y), the CPU 114 performs color calibration of the line sensor 301 in accordance with the contents of the instruction of color inspection, and creates a color calibration matrix M of the line sensor 301 (Step S602). The color calibration matrix M is a conversion condition for converting, for the color calibration, L*, a*, b* converted from the reading results obtained by the line sensor unit 312 into color values. Details of the process step of Step S602 are described later. The CPU 114 initializes a print count value P to "0" after the color calibration is performed (Step S603). The print count value P represents the number of recording sheets having the images formed thereon by the printer 150.

The CPU 114 causes the printer 150 to perform print processing of printing an inspection image including a specific color under a condition corresponding to the instruction of color inspection, and generates a printed material (Step S604). The CPU 114 causes the line sensor unit 312 to perform color measurement of the printed material (Step S605). The color measurement is performed with respect to the color inspection designation region (region $X=X_S$ to $X_E$, $Y=Y_S$ to $Y_E$ on the sheet) of the printed material. As the result of the color measurement of the printed material, the luminance data of RGB is transmitted from the line sensor unit 312 to the color detection processing unit 305. The color detection processing unit 305 derives the average luminance values ($R_A$, $G_A$, $B_A$) of the respective colors of RGB in the color measurement region from the luminance data of RGB acquired from the line sensor unit 312, and transmits the average luminance values to the CPU 114.

The CPU 114 includes a color conversion look-up table $LUT_{IN}$ for converting the luminance values (RGB data) of the respective colors of RGB into L*, a*, b* values. The CPU 114 uses the color conversion look-up table $LUT_{IN}$ to convert the average luminance values ($R_A$, $G_A$, $B_A$) of the respective colors into the $L_a^*$, $a_a^*$, $b_a^*$ values. The CPU 114 uses the color calibration matrix M created in the process step of Step S602 to derive the color values ($L_{Pa*}$, $a_{Pa*}$, $b_{Pa*}$) from the results of conversion from the average luminance values ($R_A$, $G_A$, $B_A$) to the $L_a^*$, $a_a^*$, $b_a^*$ values.

The CPU 114 derives a color difference ΔE00 between the color values ($L_{Pa*}$, $a_{Pa*}$, $b_{Pa*}$) obtained as the results of the color measurement and the color values ($L_{00}^*$, $a_{00}^*$, $b_{00}^*$) serving as color information on the specific color (Step S606). The CPU 114 compares the derived color difference ΔE00 with the color inspection threshold value Cth serving as a determination condition (Step S607). The result of the color inspection is determined based on the result of comparison between the color difference ΔE00 and the color inspection threshold value Cth.

In a case where the color difference ΔE00 is equal to or smaller than the color inspection threshold value Cth (Step S607: Y), the CPU 114 determines that a difference between the specific color of the image printed on the recording sheet and the designated specific color for which the color inspection is desired is small. In this case, the CPU 114 increments the print count value P by 1 because the printing is normally performed in the specific color (Step S608). The CPU 114 determines whether or not the print count value P has reached the number $P_{MAX}$ of sheets to be printed (Step S610). In a case where the print count value P has not reached the number $P_{MAX}$ of sheets to be printed (Step S610: N), the CPU 114 repeats the process steps of Step S604 and thereafter until the print count value P reaches the number $P_{MAX}$ of sheets to be printed. In a case where the print count value P has reached the number $P_{MAX}$ of sheets to be printed (Step S610: Y), the CPU 114 ends the print processing including the color inspection processing.

In a case where the color difference ΔE00 is larger than the color inspection threshold value Cth (Step S607: N), the CPU 114 determines that the difference between the specific color of the image printed on the recording sheet and the designated specific color for which the color inspection is desired is large. In this case, the CPU 114 causes the operation panel 120 to display a warning because the printing is not normally performed in the specific color (Step S609). The display of the warning indicates that the color inspection designation region has a color separated from the specific color $L_{00}^*$, $a_{00}^*$, $b_{00}^*$ by an amount larger than an allowable color difference (color inspection threshold value Cth), and the result of the color inspection is inappropriate. The warning may be performed through generation of sounds from a speaker in addition to the indication on the display. After the CPU 114 performs the display of the warning, the CPU 114 ends the print processing including the color inspection processing.

<Color Calibration Processing>

Figure 7:
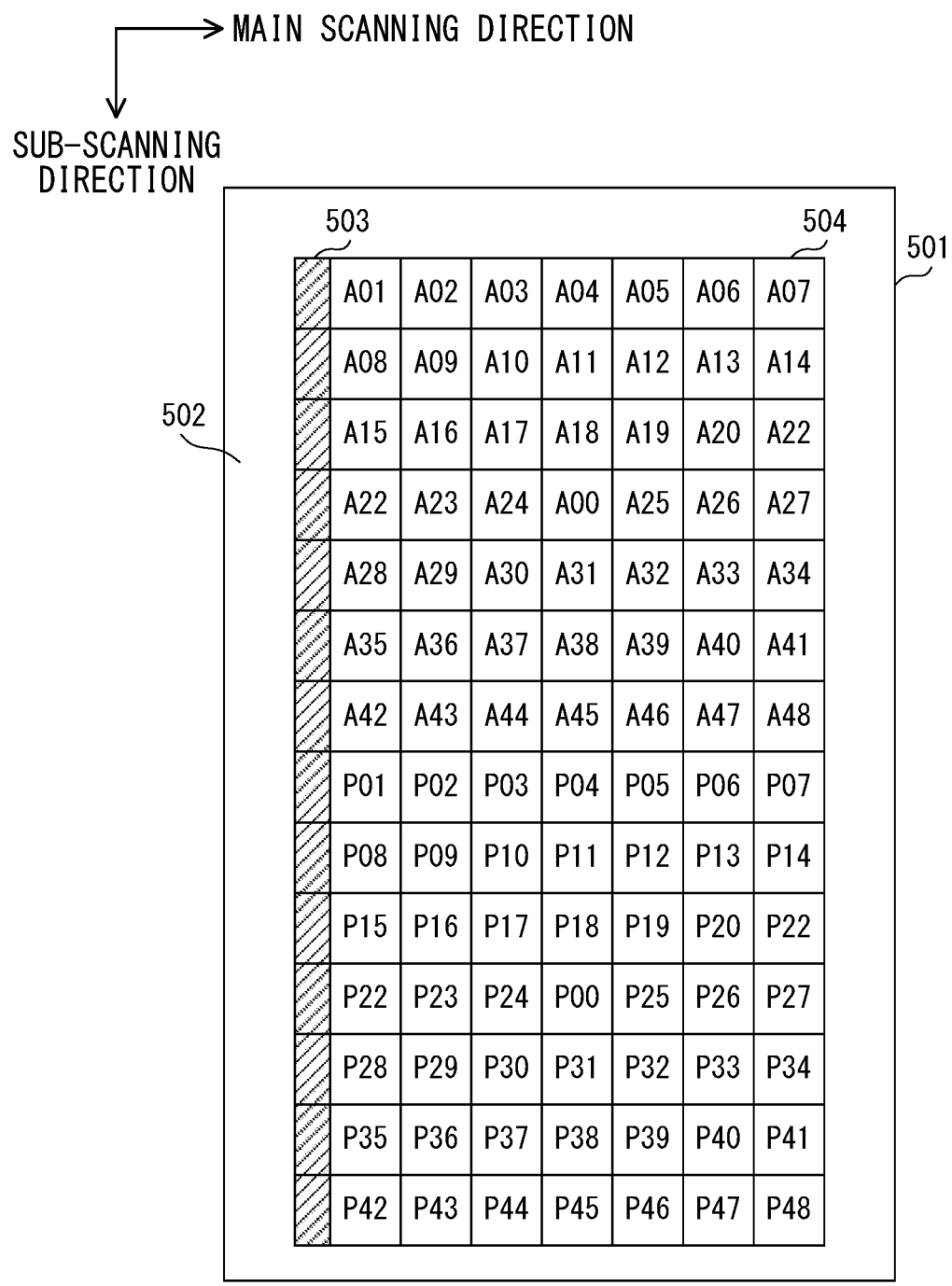
FIG. 7 is a diagram of an example of a color calibration chart.

The color calibration processing of Step S602 is described. FIG. 7 is a diagram of an example of a color calibration chart to be used in the color calibration processing of the line sensor unit 312. A color calibration chart 501 is created by printing 98 patch images 504 as the detection image on a recording sheet that is long in the sub-scanning direction. The patch images 504 are arranged in 7 rows and 14 columns in the main scanning direction and the sub-scanning direction, respectively. At a left end of the color calibration chart 501 in the main scanning direction, a margin 502 is provided. On the right side of the margin 502, a black trigger patch 503 is provided. On the right side of the trigger patch 503, the 98 patch images 504 are provided. The 98 patch images 504 for color calibration include 49 patch images written as "Axx" and 49 patch images written as "Pxx."

The 49 patch images 504 written as "Axx" are images obtained through primary selection of image density values corresponding to the specific color $L_{00}^*$, $a_{00}^*$, $b_{00}^*$ and the L*, a*, b* values of surrounding colors calculated as values separated by predetermined color differences from the specific color $L_{00}^*$, $a_{00}^*$, $b_{00}^*$. In this case, the image density values are referred to as "YMCK values." In FIG. 7, the middle patch image is an image having the YMCK values of the specific color $L_{00}^*$, $a_{00}^*$, $b_{00}^*$. The YMCK values are set for each of the colors of yellow (Y), magenta (M), cyan (C), and black (K).

The 49 patch images 504 written as "Pxx" are images obtained through secondary selection of YMCK values corresponding to the specific color $L_{00}^*$, $a_{00}^*$, $b_{00}^*$ and the L*, a*, b* values of surrounding colors calculated as values separated by predetermined color differences from the specific color $L_{00}^*$, $a_{00}^*$, $b_{00}^*$. The primary selection and the secondary selection have different selection criteria.

The method of selecting the YMCK values with respect to the L*, a*, b* values of the 98 patch images 504 is described later. The positions at which the patch images 504 of the color calibration chart 501 are formed are not limited to those of FIG. 7.

Figure 8:
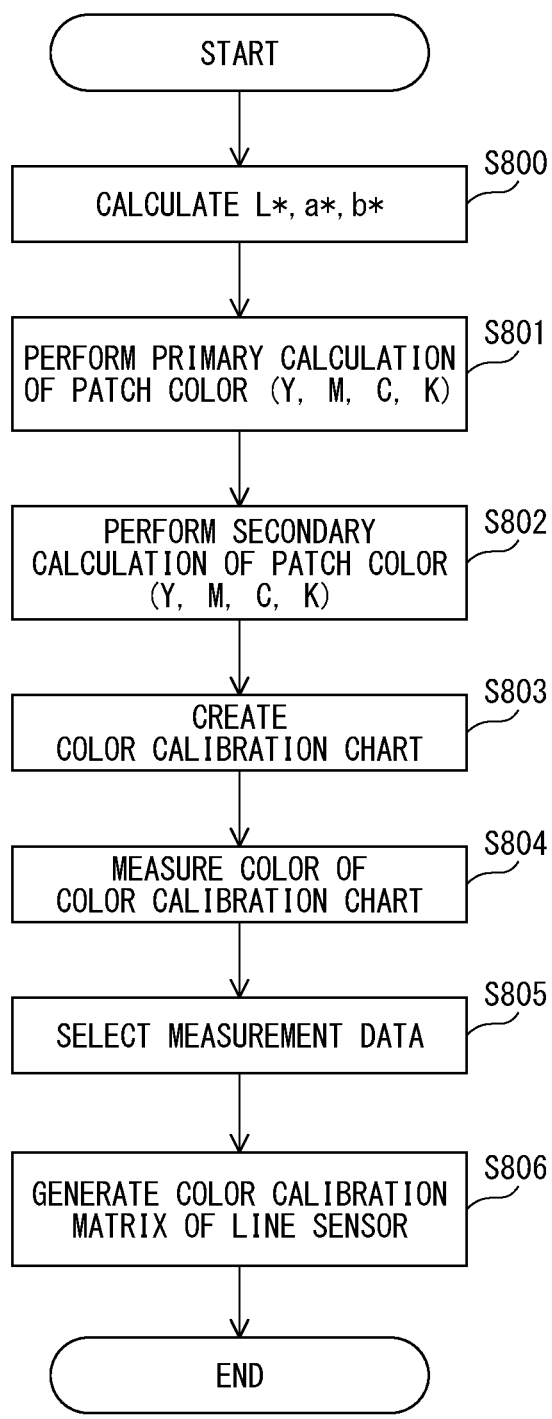
FIG. 8 is a flow chart for illustrating color calibration processing.
Figure 9:
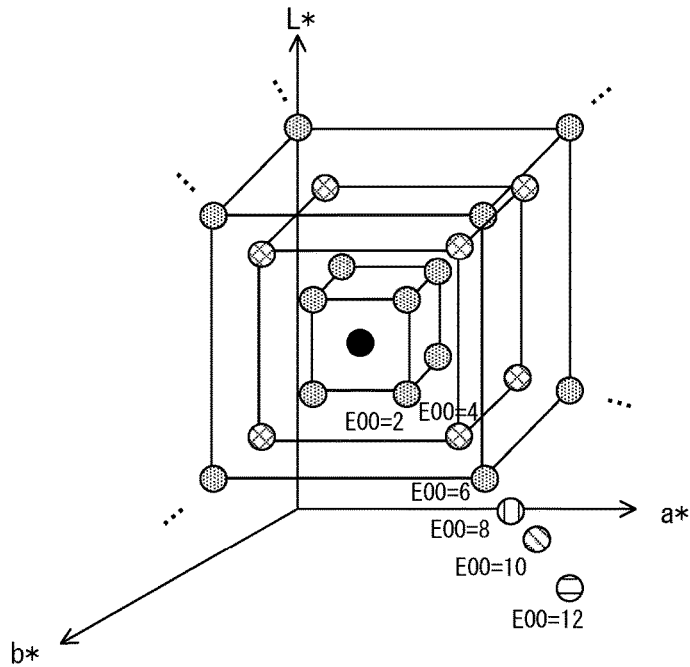
FIG. 9 is an explanatory diagram of a method of calculating L*, a*, b* of surrounding colors of a specific color.
Figure 10A:
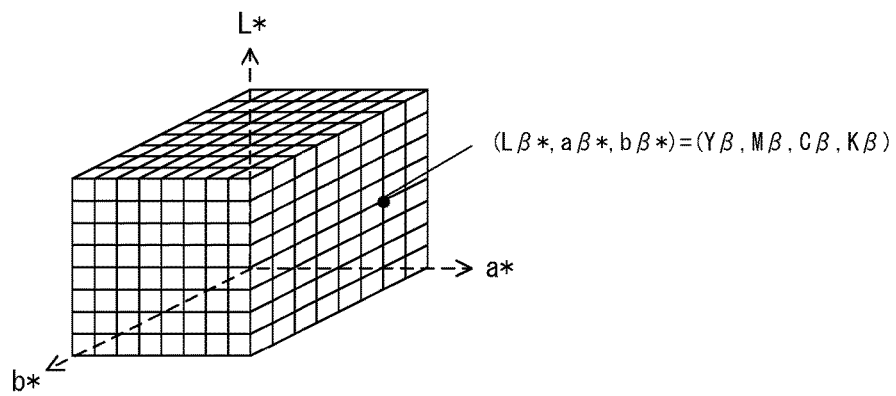
FIG. 10A and FIG. 10B are explanatory diagrams of a color conversion look-up table.
Figure 10B:
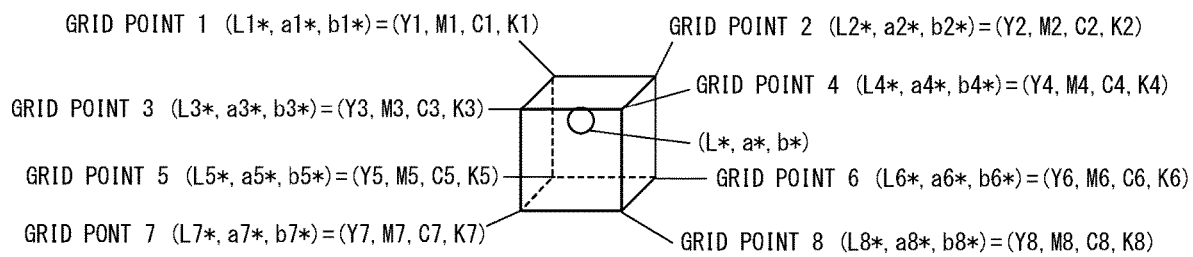

FIG. 8 is a flow chart for illustrating the color calibration processing. FIG. 9 is an explanatory diagram of a method of calculating L*, a*, b* of the surrounding colors of the specific color. FIG. 10A and FIG. 10B are explanatory diagrams of a color conversion look-up table $LUT_{OUT}$ for performing color conversion from the L*, a*, b* values to the YMCK values.

The CPU 114 calculates L*, a*, b* of the surrounding colors from the specific color $L_{00}^*$, $a_{00}^*$, $b_{00}^*$ (Step S800). For the calculation, the CPU 114 first acquires the specific color $L_{00}^*$, $a_{00}^*$, $b_{00}^*$ from the RAM 113. The CPU 114 calculates the surrounding colors separated by predetermined color differences from the specific color $L_{00}^*$, $a_{00}^*$, $b_{00}^*$. For example, as illustrated in FIG. 9, 48 surrounding colors are selected. The CPU 114 calculates L*, a*, b* of the following 48 surrounding colors corresponding to ΔE00=2, 4, 6, 8, 10, 12 as the predetermined color differences.

Surrounding color 01 to surrounding color 08 separated in color by color difference ΔE00=2
L*, a*, b*=$L_{01}^*$, $a_{01}^*$, $b_{01}^*$ to $L_{08}^*$, $a_{08}^*$, $b_{08}^*$
Surrounding color 09 to surrounding color 16 separated in color by color difference ΔE00=4
L*, a*, b*=$L_{09}^*$, $a_{09}^*$, $b_{09}^*$ to $L_{16}^*$, $a_{16}^*$, $b_{16}^*$
Surrounding color 17 to surrounding color 24 separated in color by color difference ΔE00=6
L*, a*, b*=$L_{17}^*$, $a_{17}^*$, $b_{17}^*$ to $L_{24}^*$, $a_{24}^*$, $b_{24}^*$
Surrounding color 25 to surrounding color 32 separated in color by color difference ΔE00=8
L*, a*, b*=$L_{25}^*$, $a_{25}^*$, $b_{25}^*$ to $L_{32}^*$, $a_{32}^*$, $b_{32}^*$
Surrounding color 33 to surrounding color 40 separated in color by color difference ΔE00=10
L*, a*, b*=$L_{33}^*$, $a_{33}^*$, $b_{33}^*$ to $L_{40}^*$, $a_{40}^*$, $b_{40}^*$
Surrounding color 41 to surrounding color 48 separated in color by color difference ΔE00=12
L*, a*, b*=$L_{41}^*$, $a_{41}^*$, $b_{41}^*$ to $L_{48}^*$, $a_{48}^*$, $b_{48}^*$ The CPU 114 calculates patch colors being colors of the patch images to be used in the color calibration chart 501 (performs primary selection) (Step S801). The patch colors are the image density values (YMCK values). The CPU 114 converts $L_{00}^*$, $a_{00}^*$, $b_{00}^*$ to $L_{48}^*$, $a_{48}^*$, $b_{48}^*$ calculated in the process step of Step S800 based on the color conversion look-up table $LUT_{OUT}$ stored in the ROM 112. As a result, the YMCK values corresponding to the respective L*, a*, b* values are calculated (primary calculation of the patch color (L*, a*, b*)). With reference to FIG. 10A and FIG. 10B, the color conversion look-up table $LUT_{OUT}$ for converting the L*, a*, b* values into the YMCK values being print parameters is described.

FIG. 10A and FIG. 10B show the concept of the color conversion look-up table $LUT_{OUT}$. FIG. 10A is the three-dimensional color conversion look-up table $LUT_{OUT}$ of the input color space (Lab color space). In the color conversion look-up table $LUT_{OUT}$, cubes are arrayed at equal intervals on the Lab color space. In this case, the Lab color space is a CIE 1976 (L*, a*, b*) color space, but may also be a Hunter 1948 L, a, b color space. Each vertex (grid point) of the cube represents a position (L*, a*, b* values) on the Lab color space. In this case, L* represents lightness, and a* and b* represent chromaticity. At the grid point, a patch color (YMCK values) corresponding to the L*, a*, b* values at the corresponding position is allocated.

For example, in a case where $L_\beta^*$, $a_\beta^*$, $b_\beta^*$ on the grid point are designated as the L*, a*, b* values for which conversion is desired, $Y_\beta$, $M_\beta$, $C_\beta$, and $K_\beta$ being the corresponding patch color (YMCK values) of the color conversion look-up table $LUT_{OUT}$ are output.

In FIG. 10B, a table interpolation method is described. The L*, a*, b* values for which the color conversion is desired are in a region surrounded by a grid point 1 to a grid point 8. In a case where distances from the L*, a*, b* values to the grid points 1 to 8 are d1 to d8, respectively, the patch color (YMCK values) is calculated as follows in accordance with the distances to the respective grid points.

$$Y=(Y_1/d_1+Y_2/d_2+ \ldots +Y_8/d_8)/(1/d_1+1/d_2+ \ldots +1/d_8)$$

$$M=(M_1/d_1+M_2/d_2+ \ldots +M_8/d_8)/(1/d_1+1/d_2+ \ldots +1/d_8)$$

$$C=(C_1/d_1+C_2/d_2+ \ldots +C_8/d_8)/(1/d_1+1/d_2+ \ldots +1/d_8)$$

$$K=(K_1/d_1+K_2/d_2+ \ldots +K_8/d_8)/(1/d_1+1/d_2+ \ldots +1/d_8)$$

The color conversion look-up table $LUT_{OUT}$ is stored in the ROM 112, and the conversion operation processing from the L*, a*, b* values to the patch color (YMCK values) is performed by the CPU 114.

The CPU 114 performs calculation of the patch colors (YMCK values) (performs secondary selection) (Step S802). The CPU 114 specifies at which positions on the color conversion look-up table $LUT_{OUT}$ (FIG. 10A) stored in the ROM 112 $L_{00}^*$, $a_{00}^*$, $b_{00}^*$ to $L_{48}^*$, $a_{48}^*$, $b_{48}^*$ of the specific color and the surrounding colors are located. After the CPU 114 has confirmed the positions on the color conversion look-up table $LUT_{OUT}$, the CPU 114 selects the grid points having the smallest distance among the surrounding grid points. The CPU 114 sets the YMCK values associated with the selected grid points as the calculation results (secondary calculation of the patch color (L*, a*, b*)).

For example, in FIG. 10B, the values of L*, a*, b* for which the color conversion is desired are in the region surrounded by the grid point 1 to the grid point 8. The distances from the values of L*, a*, b* to the grid points 1 to 8 are d1 to d8, respectively, and d1 has the smallest value. In this case, the YMCK values are calculated as follows.

$$Y=Y_1$$

$$M=M_1$$

$$C=C_1$$

$$K=K_1$$

The CPU 114 causes the printer 150 to create the color calibration chart 501 of FIG. 7 based on the patch colors (YMCK values) calculated in the process steps of Step S801 and Step S802 (Step S803). The CPU 114 performs color measurement of the created color calibration chart 501 by the line sensor 301 and the spectroscopic sensor unit 315 (Step S804).

The line sensor 301 outputs the luminance values (RGB data) of the respective colors being the color measurement results to the color detection processing unit 305. The color detection processing unit 305 calculates the average luminance values ($R_A$, $G_A$, $B_A$) of the respective colors of RGB in the measurement region from the RGB data acquired from the line sensor unit 312. The CPU 114 uses the color conversion look-up table $LUT_{IN}$ for converting the luminance values of R, G, and B into L*, a*, b* to convert the average luminance values ($R_A$, $G_A$, $B_A$) into the L*, a*, b* values. The CPU 114 acquires 98 Lab values as the color measurement results obtained by the line sensor unit 312. The 98 Lab values are L*, a*, b* values of $L_{L\_A00}*$, $a_{L\_A00}*$, $b_{L\_A00}*$ to $L_{L\_A48}*$, $a_{L\_A48}*$, $b_{L\_A48}*$, and $L_{L\_P00}*$, $a_{L\_P00}*$, $b_{L\_P00}*$ to $L_{L\_P48}*$, $a_{L\_P48}*$, $b_{L\_P48}*$.

The spectroscopic sensor 306 outputs the spectral data in the measurement region of the color calibration chart 501 being the color measurement results to the color detection processing unit 305. The spectral data is 98 L*, a*, b* values. Specifically, the spectral data is $L_{S\_A00}*$, $a_{S\_A00}*$, $b_{S\_A00}*$ to $L_{S\_A48}*$, $a_{S\_A48}*$, $b_{S\_A48}*$, and $L_{S\_P00}*$, $a_{S\_P00}*$, $b_{S\_P00}*$ to $L_{S\_P48}*$, $a_{S\_P48}*$, $b_{S\_P48}*$. The color detection processing unit 305 calculates the L*, a*, b* values from the spectral data acquired from the spectroscopic sensor unit 315. The color detection processing unit 305 outputs the calculated L*, a*, b* values to the CPU 114.

The CPU 114 selects, from the 98 L*, a*, b* values measured by the spectroscopic sensor 306, 49 items of data having values closest to the values of $L_{00}*$, $a_{00}*$, $b_{00}*$ to $L_{48}*$, $a_{48}*$, $b_{48}*$ calculated in Step S800 (Step S805). The selected 49 L*, a*, b* values are represented by $Z_{A00}$, $Z_{B00}$, $Z_{C00}$ to $Z_{A48}$, $Z_{B48}$, $Z_{C48}$. Further, the CPU 114 selects, from the color measurement data of the line sensor 301, 49 L*, a*, b* values obtained in a case where the colors of the same patch images as $Z_{A00}$, $Z_{B00}$, $Z_{C00}$ to $Z_{A48}$, $Z_{B48}$, $Z_{C48}$ are measured by the line sensor 301. The selected 49 L*, a*, b* values are represented by $X_{A00}$, $X_{B00}$, $X_{C00}$ to $X_{A48}$, $X_{B48}$, $X_{C48}$.

The CPU 114 generates the color calibration matrix M of the line sensor 301 (Step S806). The CPU 114 calculates, through use of $Z_{A00}$, $Z_{B00}$, $Z_{C00}$ to $Z_{A48}$, $Z_{B48}$, $Z_{C48}$ and $X_{A00}$, $X_{B00}$, $X_{C00}$ to $X_{A48}$, $X_{B48}$, $X_{C48}$ as training data, the color calibration matrix M for calibrating the measurement result of the line sensor 301 by the following expression. The color calibration matrix M is a 3×10 matrix. The CPU 114 stores the calculated color calibration matrix M into the RAM 113. As described above, the color calibration matrix M is obtained through the color calibration processing.

$$\text{Matrix } X = \begin{bmatrix} X_{A00}, X_{B00}, X_{C00}, \\ X_{A00}{}^{\wedge}2, X_{B00}{}^{\wedge}2, X_{C00}{}^{\wedge}2, & 1 \\ X_{A00}*X_{B00}, X_{B00}*X_{C00}, X_{C00}*X_{A00}, \\ X_{A01}, X_{B01}, X_{C01}, \\ X_{A01}{}^{\wedge}2, X_{B01}{}^{\wedge}2, X_{C01}{}^{\wedge}2, & 1 \\ X_{A01}*X_{B01}, X_{B01}*X_{C01}, X_{C01}*X_{A01}, \\ \vdots \\ \vdots \\ X_{A02}, X_{B02}, X_{C02}, \\ X_{A02}{}^{\wedge}2, X_{B02}{}^{\wedge}2, X_{C02}{}^{\wedge}2, & 1 \\ X_{A02}*X_{B02}, X_{B02}*X_{C02}, X_{C02}*X_{A02}, \end{bmatrix}$$

$$\text{Matrix } Z = \begin{bmatrix} Z_{A00}, Z_{B00}, Z_{C00} \\ Z_{A01}, Z_{B01}, Z_{C01} \\ \vdots \\ \vdots \\ Z_{A48}, Z_{B48}, Z_{C48} \end{bmatrix}$$

where: $X^T$ is a transpose matrix of the matrix X, and $(X^T*X)^{-1}$ is an inverse matrix of $(X^T*X)$.

As described above, in the first embodiment, the color calibration chart having printed thereon the patch images to be used for color calibration of the line sensor 301 can be created through one time of print processing. As a result, the color calibration of the line sensor 301 can be performed with high accuracy, and highly accurate color measurement of an image is allowed. Thus, a highly accurate color inspection system can be achieved.

Second Embodiment

A configuration of an image forming apparatus 100 in a second embodiment of the present disclosure is similar to that in the first embodiment. The second embodiment is different from the first embodiment in the contents of the color calibration processing, but other parts in the second embodiment are the same as those in the first embodiment. The different parts are described.

<Color Calibration Processing>

Figure 11:
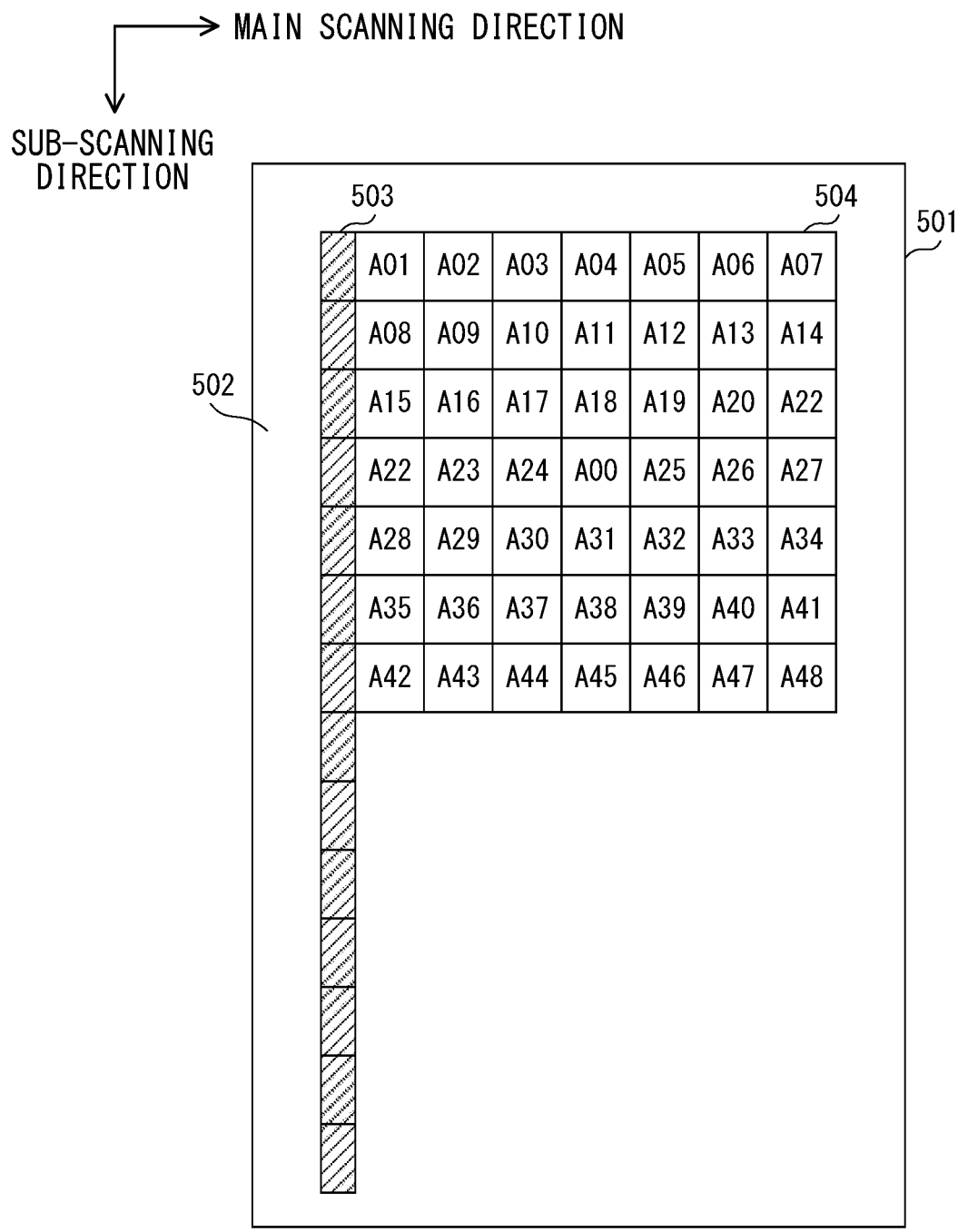
FIG. 11 is a diagram of an example of the color calibration chart.

The color calibration processing of Step S602 of FIG. 6 is described. FIG. 11 is a diagram of an example of a color calibration chart to be used in the color calibration processing of the line sensor unit 312. A color calibration chart 501 is created by printing 49 patch images 504 as the detection image on a recording sheet that is long in the sub-scanning direction. The patch images 504 are arranged in 7 rows and 7 columns in the main scanning direction and the sub-scanning direction, respectively. At a left end of the color calibration chart 501 in the main scanning direction, a margin 502 is provided. On the right side of the margin 502, a black trigger patch 503 is provided. On the right side of the trigger patch 503, the 49 patch images 504 are provided.

The 49 patch images 504 for color calibration are images having image density values corresponding to the specific color $L_{00}*$, $a_{00}*$, $b_{00}*$ and the L*, a*, b* values of surrounding colors calculated as values separated by predetermined color differences from the specific color $L_{00}*$, $a_{00}*$, $b_{00}*$. In FIG. 11, the middle patch image is an image having the image density values of the specific color $L_{00}*$, $a_{00}*$, $b_{00}*$. The image density values are set for each of the colors of yellow (Y), magenta (M), cyan (C), and black (K). In this case, the image density values are referred to as "YMCK values." The positions at which the patch images 504 of the color calibration chart 501 are formed are not limited to those of FIG. 11.

Figure 12:
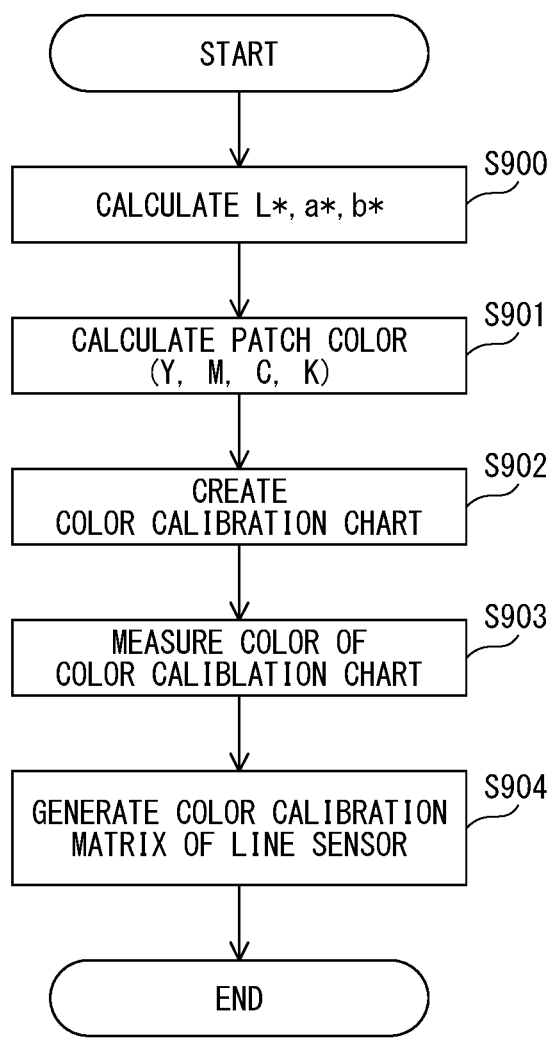
FIG. 12 is a flow chart for illustrating the color calibration processing.
Figure 13:
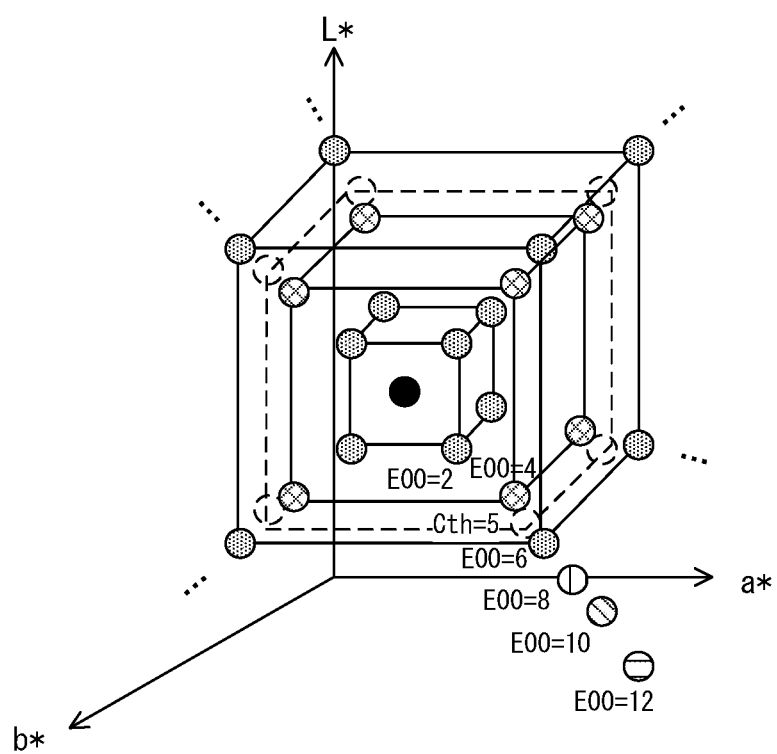
FIG. 13 is an explanatory diagram of the method of calculating L*, a*, b* of the surrounding colors of the specific color.

FIG. 12 is a flow chart for illustrating the color calibration processing. FIG. 13 is an explanatory diagram of a method of calculating L*, a*, b* of the surrounding colors of the specific color.

The CPU 114 calculates L*, a*, b* of the surrounding colors from the specific color $L_{00}^*$, $a_{00}^*$, $b_{00}^*$ (Step S900). For the calculation, the CPU 114 first acquires the specific color $L_{00}^*$, $a_{00}^*$, $b_{00}^*$, and the color inspection threshold value Cth from the RAM 113. The CPU 114 calculates the surrounding colors separated by predetermined color differences from the specific color $L_{00}^*$, $a_{00}^*$, $b_{00}^*$. The surrounding colors are selected so that the range of the predetermined color differences ranges across the color inspection threshold value Cth ($\Delta Emin < Cth < \Delta Emax$).

For example, as illustrated in FIG. 13, 48 surrounding colors are selected. FIG. 13 shows an example of a case in which the color inspection threshold value Cth is "5". The CPU 114 selects, as the predetermined color differences, $\Delta E00=2$, 4 smaller than $\Delta E00=5$ and $\Delta E00=6$, 8, 10, 12 larger than $\Delta E00=5$ so that the $\Delta E00$ ranges across $\Delta E00=5$. The CPU 114 calculates L*, a*, b* of the following 48 surrounding colors corresponding to the selected $\Delta E00$.

Surrounding color 01 to surrounding color 08 separated in color by color difference $\Delta E00=2$
L*, a*, b*=$L_{01}^*$, $a_{01}^*$, $b_{01}^*$ to $L_{08}^*$, $a_{08}^*$, $b_{08}^*$
Surrounding color 09 to surrounding color 16 separated in color by color difference $\Delta E00=4$
L*, a*, b*=$L_{09}^*$, $a_{09}^*$, $b_{00}^*$ to $L_{16}^*$, $a_{16}^*$, $b_{16}^*$
Surrounding color 17 to surrounding color 24 separated in color by color difference $\Delta E00=6$
L*, a*, b*=$L_{17}^*$, $a_{17}^*$, $b_{17}^*$ to $L_{24}^*$, $a_{24}^*$, $b_{24}^*$
Surrounding color 25 to surrounding color 32 separated in color by color difference $\Delta E00=8$
L*, a*, b*=$L_{25}^*$, $a_{25}^*$, $b_{25}^*$ to $L_{32}^*$, $a_{32}^*$, $b_{32}^*$
Surrounding color 33 to surrounding color 40 separated in color by color difference $\Delta E00=10$
L*, a*, b*=$L_{33}^*$, $a_{33}^*$, $b_{33}^*$ to $L_{40}^*$, $a_{40}^*$, $b_{40}^*$
Surrounding color 41 to surrounding color 48 separated in color by color difference $\Delta E00=12$
L*, a*, b*=$L_{41}^*$, $a_{41}^*$, $b_{41}^*$ to $L_{48}^*$, $a_{48}^*$, $b_{48}^*$ The CPU 114 calculates patch colors (Y, M, C, K) being colors of the patch images to be used in the color calibration chart 501 (Step S901). The CPU 114 converts $L_{00}^*$, $a_{00}^*$, $b_{00}^*$ to $L_{48}^*$, $a_{48}^*$, $b_{48}^*$ based on the color conversion look-up table $LUT_{OUT}$ stored in the ROM 112. As a result, the YMCK values corresponding to the respective L*, a*, b* values are calculated (calculation of the patch color (L*, a*, b*)). The color conversion look-up table $LUT_{OUT}$ for converting the L*, a*, b* values into the YMCK values being the print parameter is as described with reference to FIG. 10A and FIG. 10B in the first embodiment.

The CPU 114 causes the printer 150 to create the color calibration chart 501 of FIG. 11 based on the patch colors (YMCK values) calculated in the process step of Step S901 (Step S902). The CPU 114 performs color measurement of the created color calibration chart 501 by the line sensor 301 and the spectroscopic sensor unit 315 (Step S903).

The line sensor 301 outputs the luminance values (RGB data) of the respective colors being the color measurement results to the color detection processing unit 305. The color detection processing unit 305 calculates the average luminance values ($R_A$, $G_A$, $B_A$) of the respective colors of RGB in the measurement region from the RGB data acquired from the line sensor unit 312. The CPU 114 uses the color conversion look-up table $LUT_{IN}$ for converting the luminance values of R, G, and B into L*, a*, b* to convert the average luminance values ($R_A$, $G_A$, $B_A$) into the L*, a*, b* values. The CPU 114 acquires 49 L*, a*, b* values of $L_{L\_A00}^*$, $a_{L\_A00}^*$, $b_{L\_A00}^*$ to $L_{L\_A48}^*$, $a_{L\_A48}^*$, $b_{L\_A48}^*$, as the color measurement results obtained by the line sensor unit 312.

The spectroscopic sensor 306 outputs the spectral data of the color calibration chart 501 being the color measurement results to the color detection processing unit 305. The color detection processing unit 305 acquires 49 L*, a*, b* values of $L_{S\_A00}^*$, $a_{S\_A00}^*$, $b_{S\_A00}^*$ to $L_{S\_A48}^*$, $a_{S\_A48}^*$, $b_{S\_A48}^*$, as the spectral data. The color detection processing unit 305 calculates the L*, a*, b* values from the spectral data acquired from the spectroscopic sensor unit 315. The color detection processing unit 305 outputs the calculated L*, a*, b* values to the CPU 114.

The 49 L*, a*, b* values of the spectral data acquired by the color detection processing unit 305 are represented by $Z_{A00}$, $Z_{B00}$, $Z_{C00}$ to $Z_{A48}$, $Z_{B48}$, $Z_{C48}$. The L*, a*, b* values obtained in a case where the colors of the same patch images as $Z_{A00}$, $Z_{B00}$, $Z_{C00}$ to $Z_{A48}$, $Z_{B48}$, $Z_{C48}$ are measured by the line sensor 301 are represented by $X_{A00}$, $X_{B00}$, $X_{C00}$ to $X_{A48}$, $X_{B48}$, $X_{C48}$.

The CPU 114 generates the color calibration matrix M of the line sensor 301 (Step S904). The CPU 114 calculates, through use of $Z_{A00}$, $Z_{B00}$, $Z_{C00}$ to $Z_{A48}$, $Z_{B48}$, $Z_{C48}$ and $X_{A00}$, $X_{B00}$, $X_{C00}$ to $X_{A48}$, $X_{B48}$, $X_{C48}$ as training data, the color calibration matrix M for calibrating the measurement result of the line sensor 301. The color calibration matrix M is a 3×10 matrix. The CPU 114 stores the calculated color calibration matrix M into the RAM 113. The calculation of the color calibration matrix M is as described in the first embodiment.

As described above, in the second embodiment, the printer 150 prints, on the recording sheet, the specific color and the surrounding colors located with predetermined color differences from the specific color as the detection image so that the color calibration chart is created. The color calibration chart is read by the reader 160. Based on the result of reading the color calibration chart by the reader 160, the color conversion table of RGB→Lab for the specific color is created. As a result, the conversion accuracy from RGB to Lab with respect to colors in the vicinity of the specific color is improved, and a highly accurate color inspection system can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-038570, filed Mar. 10, 2021, and Japanese Patent Application No. 2021-038564, filed Mar. 10, 2021, which are hereby incorporated by reference herein in their entirety.

What is claimed is:

1. An information processing device comprising:
a memory configured to store color information related to a color to be inspected in an image, wherein the image is formed by an image forming apparatus; and
a controller configured to:
acquire user instruction information related an acceptable range of color difference for inspection of the color;
output test image data for forming a plurality of test images based on the color information and the user instruction information, the plurality of test images including: (i) a first test image, a color difference between the color to be inspected and a color of the first test image being within the acceptable range, and (ii) a second test image, a color difference between the color to be inspected and a color of the second test image being out of the acceptable range;
acquire first data related to the plurality of test images, wherein the first data is output by a first sensor which detects a first number of lights, each with a different wavelength, included in the reflected light from the plurality of test images;
acquire second data related to the plurality of test images, wherein the second data is output by a second sensor, which detects a second number of lights, each with a different wavelength, included in the reflected light from the plurality of test images, the second number being more than the first number;
generate, based on the first data and the second data, a conversion condition;
acquire third data related to the color to be inspected in an image formed by the image forming apparatus, wherein the third data is output by the first sensor;
convert, based on the generated conversion condition, the third data; and
determine, based on converted third data and the color information and the acceptable range, a color shift with respect to the color in the image formed by the image forming apparatus.

2. The information processing device according to claim 1, wherein the controller is configured to determine a color difference based on the color information and the converted third data, and compare the color difference with the acceptable range, and determine the color shift based on a comparison of the color difference with the acceptable range.

3. The information processing device according to claim 2, wherein the controller is configured to output a notification of an error in a case where the color difference is out of the acceptable range.

4. The information processing device according to claim 1,
wherein the wavelengths of the light detected by the first sensor include 630 nm, 530 nm, and 440 nm.

5. The information processing device according to claim 1,
wherein the first data is luminance data of the plurality of test images,
wherein the second data is spectroscopic data of the plurality of test images, and
wherein the third data is luminance data of the color to be inspected.

6. The information processing device according to claim 1,
wherein the first data is a detection result of the reflected light of red, blue, and green from the plurality of test images,
wherein the second data is a detection result of L*, a*, b* based on the reflected light from the plurality of test images,
wherein the first data is a detection result of the reflected light of red, blue, and green from the color to be inspected.

7. A method of controlling an image forming apparatus that forms an image on a sheet, the method comprising:
a first acquisition step of acquiring color information related to a color to be inspected in an image;
a second acquisition step of acquiring user instruction information related an acceptable range of color difference for inspection of the color;
a test print step of printing the plurality of test images based on the color information and the user instruction information, the plurality of test images including: (i) a first test image, a color difference between the color to be inspected and a color of the first test image being within the acceptable range, and (ii) a second test image, a color difference between the color to be inspected and a color of the second test image being out of the acceptable;
a first detecting step of detecting the plurality of test images by a first sensor, the first sensor detects a first number of lights, each with a different wavelength, included in a reflected light from the plurality of test images;
a second detecting step of detecting the plurality of test images by a second sensor, wherein the second sensor detects a second number of lights, each with a different wavelength, included in the reflected light from the plurality of test images, the second number being more than the first number;
a generation step of generating, based on a detecting result of the plurality of test images detected by the first sensor and a detecting result of the plurality of test images detected by the second sensor, a conversion condition;
a print step of printing the image;
a third detecting step of detecting the color to be inspected in the image by the first sensor;
a conversion step of converting a detecting result of the color to be inspected in the image detected by the first sensor based on the generated conversion condition; and
a determination step of determining, based on the converted detecting result of the color to be inspected in the image detected by the first sensor and the color information and the acceptable range, a color shift with respect to the color in the image formed by the image forming apparatus.

8. The method of controlling an image forming apparatus according to claim 7, further comprising a notification step of outputting a notification of an error in a case where the color difference is out of the acceptable range.

9. The method of controlling an image forming apparatus according to claim 7,
the determination step includes: a first determination step of determining a color difference based on the color information and the converted detecting result of the color to be inspected in the image detected by the first sensor, and
a comparison step of comparing the color difference with the acceptable range, and
a second determination step of determining the color shift based on a comparison of the color difference with the acceptable range.

10. The method of controlling an image forming apparatus according to claim 7,
wherein the detection result of the plurality of test images detected by the first sensor is luminance of the plurality of test images,
wherein the detection result of the plurality of test images detected by the second sensor is color values of the plurality of test images, and
wherein the detection result of the color to be inspected detected by the third sensor is luminance of the color to be detected.

11. The method of controlling an image forming apparatus according to claim 7, wherein the detection result of the plurality of test images detected by the first sensor is a detection result of the reflected light of red, blue, and green from the plurality of test images, wherein the detection result of the plurality of test images detected by the second sensor is a detection result of $L^*, a^*, b^*$ based on the reflected light from the plurality of test images, and wherein the detection result of the color to be inspected detected by the third sensor is a detection result of the reflected light of red, blue, and green from the color to be inspected.

\* \* \* \* \*